US010433010B1

(12) United States Patent
Neill

(10) Patent No.: US 10,433,010 B1
(45) Date of Patent: Oct. 1, 2019

(54) PREDICTIVE CONTENT PLACEMENT ON A MANAGED SERVICES SYSTEM

(71) Applicant: CSC Holdings, LLC, Bethpage, NY (US)

(72) Inventor: Richard Neill, Syosset, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/715,778

(22) Filed: Sep. 26, 2017

Related U.S. Application Data

(63) Continuation of application No. 14/338,002, filed on Jul. 22, 2014, now Pat. No. 9,807,457, which is a continuation of application No. 13/040,771, filed on Mar. 4, 2011, now Pat. No. 8,826,313.

(51) Int. Cl.
| H04N 7/16 | (2011.01) |
| H04N 21/45 | (2011.01) |
| H04N 21/81 | (2011.01) |
| H04N 21/25 | (2011.01) |
| H04N 21/442 | (2011.01) |

(52) U.S. Cl.
CPC ....... *H04N 21/4532* (2013.01); *H04N 21/252* (2013.01); *H04N 21/44213* (2013.01); *H04N 21/812* (2013.01)

(58) Field of Classification Search
CPC ......... H04N 21/44222; H04N 21/4394; H04N 21/812; H04N 21/44008; H04N 21/8352; H04N 21/6582; H04N 21/4325; H04N 21/4532; H04N 21/25891; H04N 21/435; H04N 21/235

USPC ........................ 725/14, 34, 35; 709/217–232
See application file for complete search history.

(56) References Cited

U.S. PATENT DOCUMENTS

| 6,195,622 | B1 | 2/2001 | Altschuler |
| 6,637,029 | B1 | 10/2003 | Maissel et al. |
| 6,727,914 | B1 | 4/2004 | Gutta |
| 7,039,933 | B1 * | 5/2006 | Chen ................. H04N 21/2221 375/E7.004 |
| 7,051,352 | B1 | 5/2006 | Schaffer |
| 7,590,935 | B2 | 9/2009 | Dumitru |
| 7,644,427 | B1 | 1/2010 | Horvitz |
| 7,690,013 | B1 * | 3/2010 | Eldering ............... G06Q 30/02 725/32 |
| 7,716,704 | B2 | 5/2010 | Wang |

(Continued)

OTHER PUBLICATIONS

U.S. Appl. No. 14/338,002, filed Jul. 22, 2014, entitled "Predictive Content Placement on a Managed Services System".

*Primary Examiner* — Annan Q Shang
(74) *Attorney, Agent, or Firm* — Sterne, Kessler, Goldstein & Fox, P.L.L.C.

(57) ABSTRACT

A distributed stochastic learning agent analyzes viewing and/or interactive service behavior patterns of users of a managed services system. The agent may operate on embedded and/or distributed devices such as set-top boxes, portable video devices, and interactive consumer electronic devices. Content may be provided with services such as video and/or interactive applications at a future time with maximum likelihood that a subscriber will be viewing a video or utilizing an interactive service at that future time. For example, user impressions can be maximized for content such as advertisements, and content may be scheduled in real-time to maximize viewership from across all video and/or interactive services.

20 Claims, 10 Drawing Sheets

(56) References Cited

U.S. PATENT DOCUMENTS

| | | | |
|---|---|---|---|
| 7,757,250 B1 | 7/2010 | Horvitz | |
| 7,904,908 B2 | 3/2011 | Neill et al. | |
| 7,937,725 B1 | 5/2011 | Schaffer et al. | |
| 8,060,904 B1* | 11/2011 | Evans | H04N 21/23424 |
| | | | 725/100 |
| 8,151,295 B1* | 4/2012 | Eldering | H04N 21/4331 |
| | | | 725/34 |
| 8,374,984 B2 | 2/2013 | Tullio | |
| 8,560,371 B2* | 10/2013 | Levitt | G06Q 10/06311 |
| | | | 705/7.18 |
| 8,826,313 B2 | 9/2014 | Neill | |
| 2002/0129368 A1* | 9/2002 | Schlack | G06Q 30/02 |
| | | | 725/46 |
| 2002/0178447 A1* | 11/2002 | Plotnick | H04N 5/445 |
| | | | 725/36 |
| 2004/0003391 A1 | 1/2004 | Gutta | |
| 2004/0049788 A1* | 3/2004 | Mori | H04N 7/17318 |
| | | | 725/58 |
| 2005/0039206 A1 | 2/2005 | Opdycke | |
| 2006/0106743 A1 | 5/2006 | Horvitz | |
| 2006/0225088 A1* | 10/2006 | Gutta | H04H 60/372 |
| | | | 725/14 |
| 2007/0028266 A1 | 2/2007 | Trajkovic et al. | |
| 2007/0044122 A1 | 2/2007 | Scholl | |
| 2007/0089129 A1 | 4/2007 | Verhaegh | |
| 2007/0250863 A1 | 10/2007 | Ferguson | |
| 2008/0114639 A1* | 5/2008 | Meek | G06Q 30/02 |
| | | | 705/14.41 |
| 2008/0120650 A1 | 5/2008 | Orihara | |
| 2008/0195459 A1 | 8/2008 | Stinski | |
| 2008/0222680 A1 | 9/2008 | Murakami | |
| 2008/0249969 A1 | 10/2008 | Tsui | |
| 2008/0313038 A1* | 12/2008 | Wajihuddin | G06Q 30/02 |
| | | | 705/14.41 |
| 2009/0031339 A1* | 1/2009 | Pickens | G06Q 30/0244 |
| | | | 725/32 |
| 2009/0106100 A1* | 4/2009 | Mashinsky | G06Q 30/02 |
| | | | 705/14.1 |
| 2009/0133058 A1* | 5/2009 | Kouritzin | G06Q 30/02 |
| | | | 725/34 |
| 2009/0150126 A1* | 6/2009 | Sellamanickam | G06N 7/005 |
| | | | 703/2 |
| 2010/0100419 A1* | 4/2010 | Natoli | G06Q 30/02 |
| | | | 705/7.31 |
| 2010/0114719 A1 | 5/2010 | Steelberg | |
| 2010/0186025 A1 | 7/2010 | Thomas | |
| 2010/0217664 A1 | 8/2010 | Steelberg | |
| 2010/0223641 A1 | 9/2010 | Hubbard | |
| 2010/0262494 A1* | 10/2010 | Marshall | G06Q 30/02 |
| | | | 705/14.53 |
| 2010/0299209 A1* | 11/2010 | Mehta | G06Q 10/04 |
| | | | 705/14.66 |
| 2011/0238608 A1 | 9/2011 | Sathish | |
| 2012/0089996 A1 | 4/2012 | Ramer | |
| 2012/0179557 A1 | 7/2012 | Gross | |
| 2012/0227064 A1 | 9/2012 | Neill | |
| 2013/0014159 A1 | 1/2013 | Wiser | |

\* cited by examiner

PREDICTIVE CONTENT PLACEMENT ON A MANAGED SERVICES SYSTEM

This application is a continuation of U.S. patent application Ser. No. 14/338,002, filed on Jul. 22, 2014, now U.S. Pat. No. 9,807,457, which is a continuation of U.S. patent application Ser. No. 13/040,771, filed on Mar. 4, 2011, now U.S. Pat. No. 8,826,313, each of which is incorporated herein by reference in its entirety.

BACKGROUND

Field of the Invention

Embodiments of the invention relate generally to content placement, and more particularly to predictive content placement on a managed services system.

Background Art

Attempts have been made to approximate behavior patterns of a population based on a survey of a subset of the population. However, extrapolating user behavior patterns for the entire population, based on a subset of users, is inexact and fails to capture all behavioral details of all users. Furthermore, a survey of a subset of a viewing population requires time for collecting/moving the raw data to a processor, analyzing and processing the raw data, and extrapolating approximations over time. Existing systems are unable to perform real-time analysis using detailed user behavior patterns for an entire population.

BRIEF DESCRIPTION OF THE DRAWINGS/FIGURES

The accompanying drawings are included to provide further understanding of the invention, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

Figure 1:
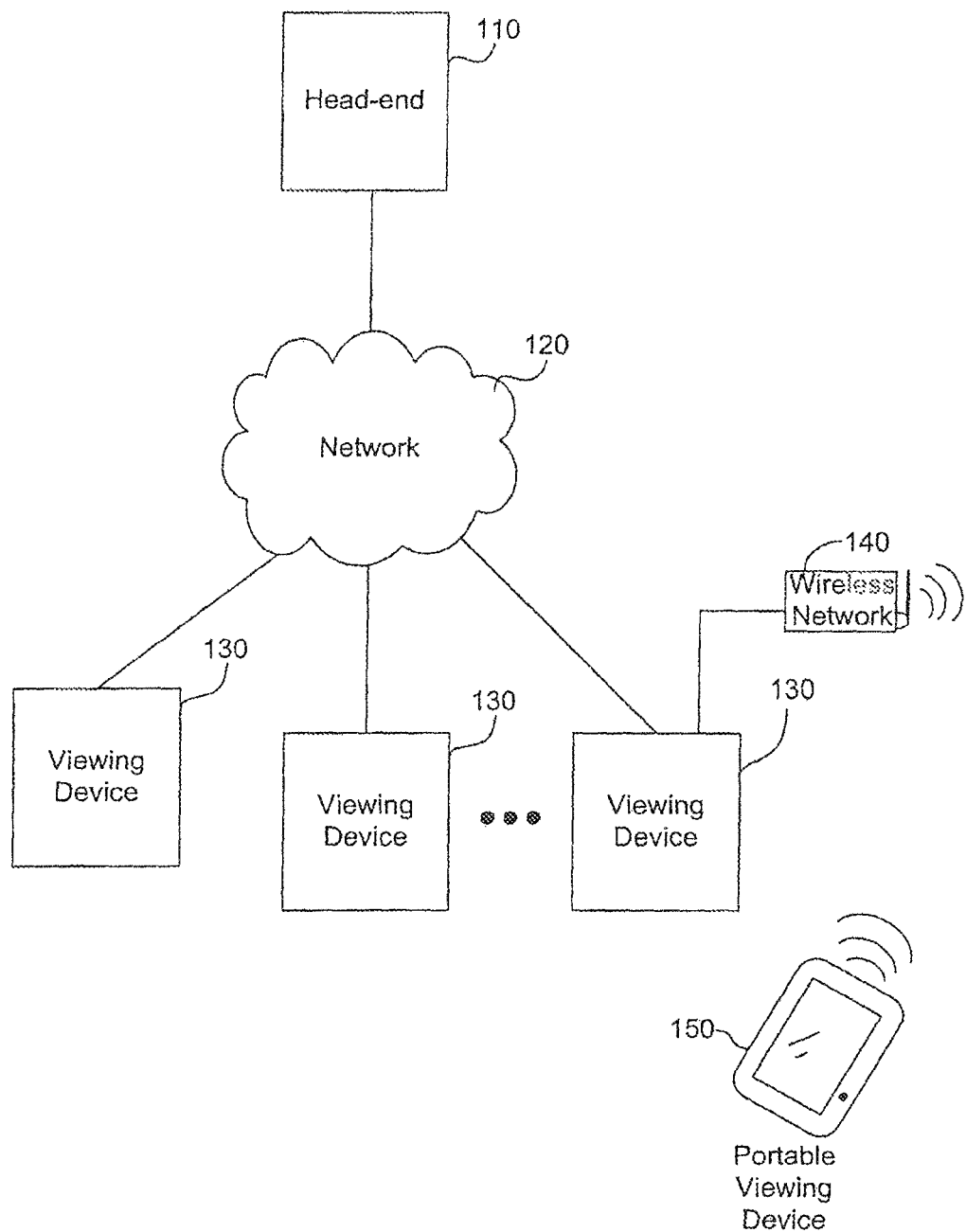
FIG. 1 is a block diagram of an architecture of a predictive content placement system including viewing devices according to an embodiment.

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Real-time predictive content placement may be used to place advertisements or other content on services such as video and/or interactive applications at a future time, with maximum likelihood that a subscriber will be viewing that service at that given future time. Placement may be based on past or present viewing/interactive service behavior patterns. Content may be scheduled in real-time to maximize viewership from across all video and/or interactive services. A distributed stochastic learning agent may operate on embedded devices such as set-top boxes, portable video devices, and interactive consumer electronic devices to process raw user data and efficiently send the processed data to a central server.

The specific illustrations and embodiments are described with respect to predictive content placement for viewing devices in connection with a head-end that is configured to provide content. A user can interact with a viewing device, e.g., change channels on a cable set-top box, to control content delivered by a head-end. A distributed client agent running on a viewing device can collect and process the user's activity, such as user control inputs, at the viewing device. The client agent can process the user activity and produce user data, a compact representation of the user activity at an instant and/or over time.

The client agent can send the processed user data to the head-end for storage and/or for additional processing by the head-end. A client agent can communicate with other client agents, and can receive information from the head-end. The head-end can update the client agent including updating initialization values and/or a distributed processing algorithm used to process the user activity and produce user data. The head-end can include multiple servers in communication with each other and the client agents.

Embodiments of viewing devices can include various platforms such as personal computers, cellular telephones, personal digital assistants (PDAs), tablets (e.g., Apple® iPad™), other mobile devices, Internet Protocol (IP)-based telephones using voice over IP (VOIP), and other systems capable of displaying media and/or utilizing a network connection such as the Internet. Furthermore, embodiments of viewing devices may include devices that do not include a display, e.g., a home gateway, server, headless computer, and so on. A viewing device may or may not provide an interface for user interaction. Embodiments of viewing devices also may include multiple devices that can interact with each other. For example, a user may provide user activity to a first viewing device (e.g., smart phone), and the user activity can be passed to a second viewing device (home server) configured to process the user activity. Thus the user does not interact directly with the second viewing device. Additionally, a user may provide user activity directly to a non-display device. References to a viewing device should therefore be interpreted to include these and other similar systems that may involve displaying and/or interacting with media, and/or communicating with a head-end and/or server.

FIG. 1 is a block diagram of an architecture of a predictive content placement system 100 including viewing devices according to an embodiment. Head-end 110 communicates with viewing devices 130 via network 120. Viewing device 130 may be a set-top box. Head-end 110 may provide viewing content to viewing devices 130, and viewing devices 130 may provide data to head-end 110 based on user commands. Viewing device 130 may be coupled to a display device such as a television, and viewing device 130 may include other devices such as a network-enabled television.

Viewing device 130 may include and/or communicate with a local network access point 140 to provide network access to devices such as portable viewing device 150. Local network access point 140 may be wired or wireless, including wireless local area network (WLAN) protocols such as Wi-Fi. As illustrated, portable viewing device 150 communicates to network 120 via viewing device 130. Alternatively, portable viewing device 150 may communicate with network 120 through a network access point (such as access point 140) that does not route through viewing device 130.

Each of head-end 110, viewing device 130, and portable viewing device 150 may be implemented on any type of computing device. Such computing device may include, but is not limited to, a personal computer, mobile device such as a mobile phone, workstation, embedded system, game console, television, set-top box, or any other computing device. Further, a computing device may include, but is not limited to, a device having a processor and memory for executing and storing instructions. Software may include one or more applications and an operating system. Hardware may include, but is not limited to, a processor, memory and graphical user interface display. The computing device may also have multiple processors and multiple shared or separate memory components. For example, the computing device (e.g., head-end 110) may be a clustered computing environment or server farm.

User activity may be acquired at the viewing device 130 and/or the portable viewing device 150. Viewing device 130 may receive user activity from a user, the user activity including channel tuning, interactive commands, commands entered into a remote control device, gestures for a touch screen and/or other user inputs associated with provided content. User activity may be stored at the head-end 110, and may be stored based on a distributed usage data collection system at viewing device 130, portable viewing device 150, and/or other systems in communication with network 120. Head-end 110 may include a distributed group of multiple head-end units.

User activity/data may be analyzed at head-end 110, and may be analyzed using distributed computation at the viewing device 130 and/or portable viewing device 150. Distributed computation may be used to analyze data at multiple head-end units communicating with each other. User activity/data from a viewing device may be processed and/or passed to other viewing devices, which may further process or distribute the data. Viewing devices may include an embedded device client agent.

Figure 2:
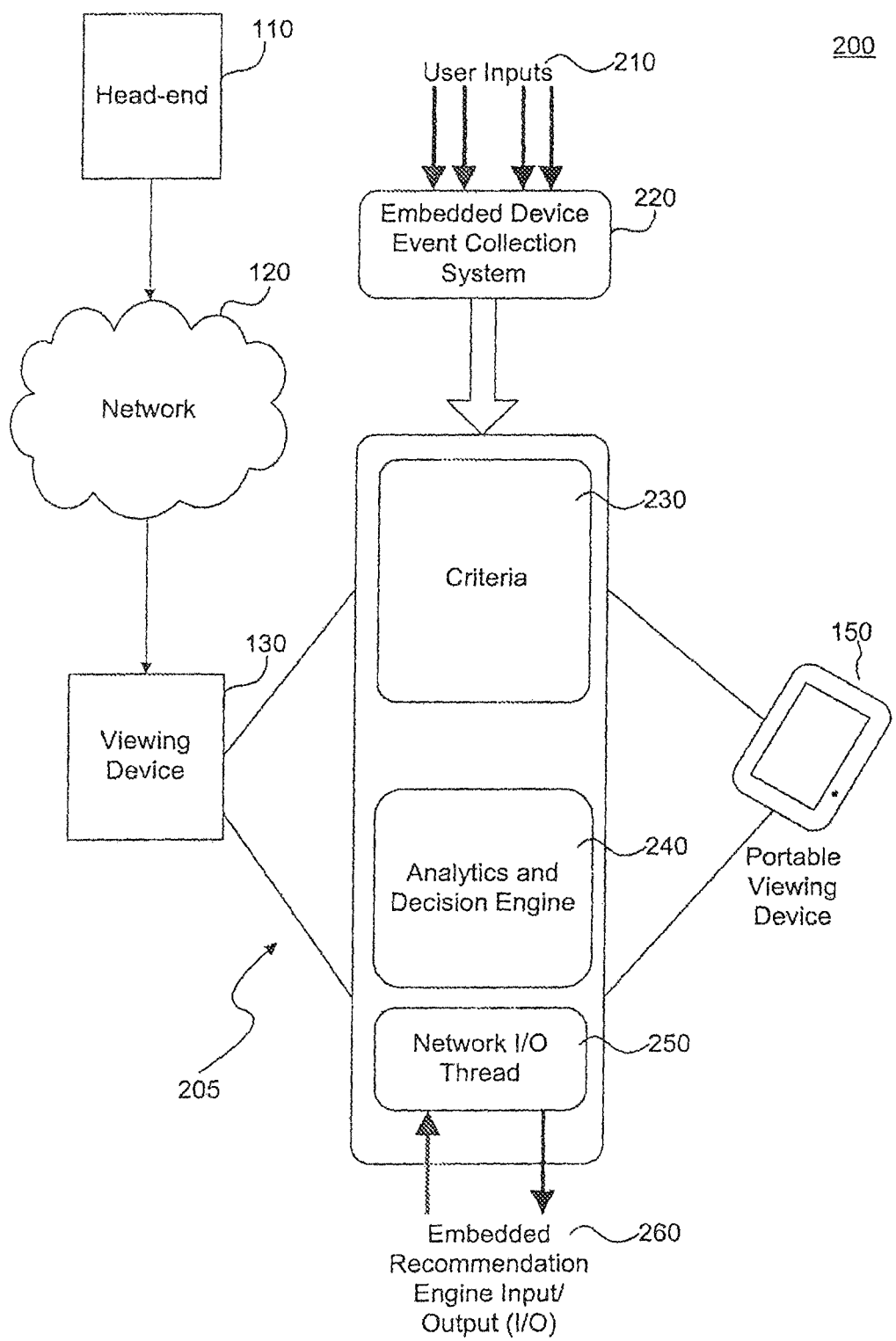
FIG. 2 is a block diagram of an architecture of a predictive content placement system including a distributed agent according to an embodiment.

FIG. 2 is a block diagram of an architecture of a predictive content placement system 200 including a distributed agent according to an embodiment. Head-end 110 interacts with viewing device 130 and/or mobile viewing device 150 via network 120. Viewing device 130 and/or mobile viewing device 150 may include and/or communicate with a client agent 205, which may be embedded on the viewing device 130 and/or the mobile viewing device 150, or other client device. In an embodiment, client agent 205 may be executable code installable in viewing device 130 and/or viewing device 150.

Client agent 205 associated with the viewing device 130/150 includes embedded device event collection system 220, criteria 230, analytics and decision engine 240 (operating using, e.g., a Hidden Markov Model (HMM), Beyesian network, and/or other algorithm), and network Input/Output (I/O) thread 250. The client agent 205 may acquire and store channel tuning and other user activity, e.g., user inputs 210. The client agent 205 may exchange information using embedded recommendation engine input/output (I/O) 260. For example, client agent 205 may receive updated algorithms or parameters via engine I/O 260 for use in the client agent 205 for processing the user inputs 210.

User inputs 210, which may include queued/stored data associated with user inputs 210, are passed to a programmable machine learning algorithm that may be implemented using criteria 230 and/or decision engine 240 of client agent 205. The criteria 230 and/or decision engine 240 can use algorithms and operating parameters to process the user inputs 210. The algorithms and operating parameters may be established at the client agent 205 during an initialization phase, during which the algorithm and operating parameters are passed from head-end 110 to the client agent 205 via the engine I/O 260.

The client agent 205 may use a machine learning algorithm to compute an optimal viewing pattern graph as a function of time, based on a universe of all viewing activities for a viewing device 130 or 150. Decision engine 240 can be implemented in any number of forms including machine learning techniques, belief networks, inference engines, decision tree engines, regression analysis (including linear and/or statistical), data mining, support vector machines (SVMs), and other techniques of implementing a decision/recommendation component. For example, decision engine 240 may use a HMM implementation of the machine learning algorithm, and/or a channel behavior transition matrix implementation. Decision engine 240 can build up an inference, and/or make a decision, based on arbitrary criteria 230. Criteria 230 may be associated with weightings and/or scattered values that are distributed to the viewing devices 130/150. The criteria 230 can be adapted via feedback within the system and/or across clusters of systems. The machine learning algorithm may also be implemented as a Bayesian network, cluster analysis, machine inference and learning algorithm, or other algorithm to process user inputs 210.

A system using client agent 205 can be adaptive, real-time, and scalable to large sample spaces (e.g., scalable to an entire population of a managed service system such as a cable television delivery system). It is not necessary to transmit raw/unprocessed user input 210 to head-end 110. Rather, the client agent 205 may output a predicted or maximum likelihood estimator of a channel/service/time state vector that is obfuscated within the client agent 205, thus providing means of reducing data transfer overhead associated with required time, network bandwidth, latency and so on to allow increased scalability to very large populations.

The vector summary may be sent via network 120 to other client agent(s) 205, head-end 110, and/or a server system. The vector summary may be sent using a communication protocol, such as engine I/O 260. Accordingly, the system is scalable such that all user inputs 210 for all viewing devices 130/150 may be collected in real-time and included in prediction analysis, while processing load/traffic associated with the network 120 and head-end 110 can be reduced. Scalability of the system to very large populations ensures a high level of accuracy, because accuracy can be proportional to sample size. Similarly, predicted error can be inversely proportional to sample size. Statistical accuracy in a probabilistic sense is a function of the population size. The larger the population, the greater the accuracy of that behavioral determination in terms of group behavior. Embodiments allow working on a much greater scale, resulting in much higher accuracy compared to analysis based on subsets of a population.

A client agent 205 may be associated with each viewing device 130 and/or 150. Accordingly, user inputs 210 may be processed in a distributed processing architecture such that multiple client agent 205 operate simultaneously on respective viewing devices 130/150, sending a processed vector summary of all relevant user inputs 210 to the head-end 110.

The suitability of an algorithm used by a client agent 205 may vary depending on the application. An application associated with data summarization may be better suited to a Bayesian based algorithm, e.g., involving the accumulation of probabilities. An application associated with, e.g., predicted advertisement targeting may be better suited to a Markov based algorithm (Hidden Markov Model; HMM). An application associated with, e.g., automated personalized playlist generation or a social application may be better suited to Bayesian, clustering, and/or collaborative filtering algorithms. Multiple algorithms may be implemented for an application, and may be swapped out based on feedback or other performance attributes. The performance of algorithms may also be varied by adjusting parameters for the various algorithms in real-time using the distributed computing embodiments described herein.

Results from the distributed processing may be used locally by a viewing device, or remotely at a server. For example, a portable viewing device 150 may use processing results to locally generate a playlist recommendation at the portable viewing device 150. A server may use processing results for advertisement targeting or managing delivery of services or other server-based applications.

Ad targeting prediction may be based on a HMM algorithm, whereas playlist prediction may be based on Bayesian/clustering. Playlist prediction/creation can incorporate a feedback based on user behavior in response to the output of the recommendation engine. A user may be presented with a playlist that is predicted to be enjoyed by the user based on previous viewing/listening selections made by the user. Upon using the playlist, the user may skip or repeat various tracks, which may be received as positive or negative feedback for the Bayesian algorithm.

A HMM may predict next state behavior based on previous states. Criteria 230 of client agent 205 can include a matrix/array of probabilities having channels on the x-axis representing a source, and channels on the y-axis representing the destination. Each cell of the matrix may be associated with a probability associated with the corresponding channels. Each channel may be associated with a user input and associated outcome/event. Probabilities may be weighted by using coefficient values. Recommendation engines may involve a HMM or other algorithm.

A distributed device 130/150 may launch a recommendation engine, and parameters and/or algorithms used in the recommendation engine may be modified by using feedback. Feedback can enable the system to determine whether accuracy of the predicted content is diverging from desired content, and determine whether a different algorithm or parameter can be used to converge the predicted with the desired content. For example, a user may be presented with a playlist, and user activity can be monitored to determine if the user skips the provided playlist. Feedback may be implemented at the distributed device, at the central head-end/server, or a combination of both including feedback between the device and the head-end/server.

Negative or positive feedback may be used. Embodiments may use a difference, or delta, between what a user wanted and what was received. For example, a system can provide an advertisement for a user. If the user watches the advertisement, the delta may be adjusted to reflect positive feedback. If the user tunes away from the advertisement, the delta may be adjusted to reflect negative feedback. The delta may be used as a correction factor in the feedback loop for improving later computations. The delta may be sent to a local clustering system that recognizes the delta as an error term. Thus, systems can avoid providing undesired content, based on the negative feedback, that previously would have been selected and provided absent the feedback.

Feedback may be implemented as a closed-loop feedback system. The system makes a recommendation and the feedback is used to groom the user experience. Feedback may be used to adjust performance for multiple users. A system may identify negative feedback showing up on multiple distributed devices, and the feedback is sent to the head-end system to adjust the advertisement recommendation and update viewing parameters/coefficients/algorithms to better reflect user desires. Feedback also can be shared among multiple distributed devices, e.g., sent between one distributed device to another without sending to the head-end.

Embodiments of the invention offer value to managed services systems in that optimal content can be predicted for users. Recommendations/predictions are stochastic in the sense that underlying factors are not necessarily fully deterministic. Advertisements can reach larger audiences with greater known probability of retained viewers and reduced tune-aways. Business intelligence associated with user prediction/feedback provides a premium service for content/advertisement placement. Embodiments of the invention are not limited to advertisement placement. The distributed recommendation framework described herein may be adapted to other applications where future behavior, in a probabilistic sense, may be leveraged to improve service, value, or drive revenues. Embodiments enable a content provider to pre-sell business intelligence regarding advertisements and other content based on predicted performance prior to airing. The specific ad selection may be handled automatically in real-time without operator intervention, based on the predicted performance and real-time user feedback.

Additional applications are contemplated based on the embodiments described herein. Systems can provide bandwidth optimization and tuning based on stochastic predictions. A head-end based network DVR system may benefit from optimization based on the systems described herein for content migration and moving storage of network DVR data. Data movement may be synchronized based on distributed real-time analysis of user behavior and other features described herein. A social networking application may benefit from coordinated movement of data or other benefits including coordinated synchronization of information among many users. Applications based on a distributed data system may benefit by implementing embodiments described herein, including systems where each distributed device processes raw data and a centralized system aggregates the processed results from each device.

Distributed recommendation enables each of many devices distributed among the users to calculate a prediction vector, for real-time decision making systems. A prediction vector from each distributed device can be shared among the distributed devices and/or pushed to the head-end, avoiding a need to transmit the bulky raw data or have a centralized server perform all the calculating.

Embodiments generate predicted future user activity for optimal content placement. Distributed and centralized data mining and analytics may be used for predicting activities. Viewing devices, such as set-top boxes, may be used in conjunction with cloud servers to predict what future viewing behaviors will be expressed. This information may be used to optimize placement of content, such as ads/overlays, with maximum probability that the content will be viewed. Benefits provided include distributed compaction of raw data and operation of a prediction/recommendation engine. Predictions can be made per customer, per stream/channel, per device, and per cluster (e.g., cluster of users by predicted channel/destination). Entire viewing populations may be handled by a scalable system without a need to selectively omit or extrapolate data.

Figure 3:
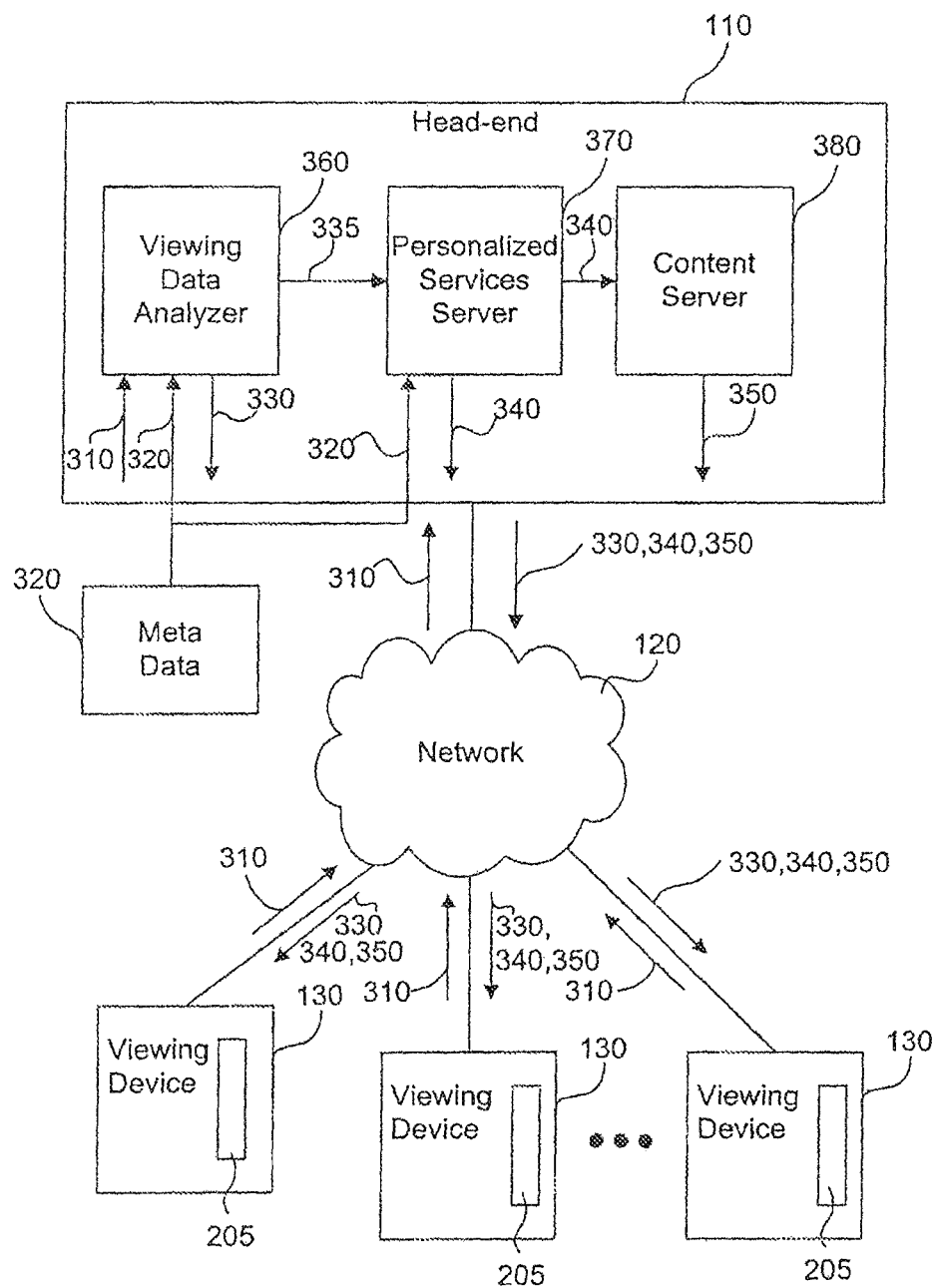
FIG. 3 is a block diagram of an architecture of a predictive content placement system including a head-end according to an embodiment.

FIG. 3 is a block diagram of an architecture of a predictive content placement system 300 including a head-end according to an embodiment. Head end 110 includes viewing data analyzer 360, personalized services server 370, and content server 380. Head-end 110 is connected to viewing devices 130 via network 120. Multiple viewing devices 130 are illustrated exchanging data with head-end 110, including user data 310, meta data 320, operating parameters 330, services 340, and viewing content 350. Viewing devices 130 may be portable viewing devices, and each viewing device 130 may include a corresponding client agent 205.

Output (operating parameters 330) from the viewing data analyzer 360 may be sent to the viewing devices 130, and may also be sent to personalized services server 370. Personalized services server 370 may send output, e.g., services 340, to the viewing devices 130. Personalized services server 370 also may send output to content server 380. Services 340 can include personalized playlists, customized advertisements, and other services that have been customized and/or personalized based on processed results 335 and/or meta data 320. Viewing data analyzer 360 may process the vector summary user data 310 and provide processed results 335 that the personalized services server 370 may use in determining which personalized services to provide. Personalized services server 370 also may send output services 340 to content server 380. Content server 380 may incorporate services 340 and/or interactive content into the viewing content 350 sent to the viewing devices 130.

The client agents 205 may be executed concurrently on respective viewing devices 130/150 participating in the system of FIG. 3, including execution on subsets of viewing devices 130/150, e.g., under control of a service provider. Operating parameters 330, including algorithms, may be distributed/scattered from viewing data analyzer 360 to each client agent 205. The client agents 205 can use the operating parameters 330 for processing user input activity and producing user data 310. Distributed processing may also be implemented, for example, as disclosed in U.S. Pat. No. 7,904,908, filed Feb. 28, 2006 and entitled "Methods and Systems for Distributed Processing on Consumer Devices," the contents of which are hereby incorporated by reference in full.

Distributed processing using client agent 205 enables a viewing device 130 to process raw data such as user input activity at the viewing device 130, producing user data 310. User data 310 may be a state vector summary, representing the user inputs and other information in a much smaller format compared to raw data. The user data 310 may be sent to head-end 110 which may aggregate and/or further process the user data 310. Accordingly, distributed processing enables large amounts of user input activity to be processed, without needing to communicate the raw/unprocessed user input activity information over network 120. Distributed processing thereby enables a great savings of bandwidth that would otherwise be consumed by transmitting raw data associated with user inputs. Similarly, savings of processing at the head-end 110 is also realized because data has already been processed by the client agents 205. The potential sample size of a viewing population can thereby be maximized for a given set of network/central processing bandwidth, without being otherwise limited by typical network bandwidth or processing power constraints of a central server relative to the amount of data transportation and processing achieved.

Embodiments may analyze user behavior from the entire user population, drawing input from every user. Accordingly, it is not necessary to limit sampling to a subset of the user population and/or user activity inputs, even when the user population is relatively large. The ability to analyze the entire user population is enhanced by distributed computing and distributed recommendation processing that is performed at the distributed viewing devices 130/150. Each viewing device 130/150 may provide vector summaries of all its associated raw data. Accordingly, devices do not need to be selective about what raw data to analyze and/or send, and the system is capable of analyzing all data from all of the user population. Embodiments provide additional benefit of bandwidth optimization, reducing overall bandwidth requirements for transmitting data between the head-end/server and each of the distributed devices.

Distributed processing enables analysis to be performed locally at the viewing device 130/150. Vector summaries sent as user data 310 to the head-end 110 enable analysis to be performed at the head-end 110, efficiently for every user and/or viewing device. Embodiments may adjust the proportion of processing handled by the head-end 110 versus the viewing device 130, along with the associated resource/bandwidth usage, based on the type of analysis corresponding to various applications provided for the user. A standardized communication protocol may be used for communication among the head-end 110 and viewing devices 130/150. For example, a Messaging Processing Interface (MPI) language can be used to transmit and receive user data 310, meta data 320, operating parameters 330, services 340, and viewing content 350.

Figure 4:
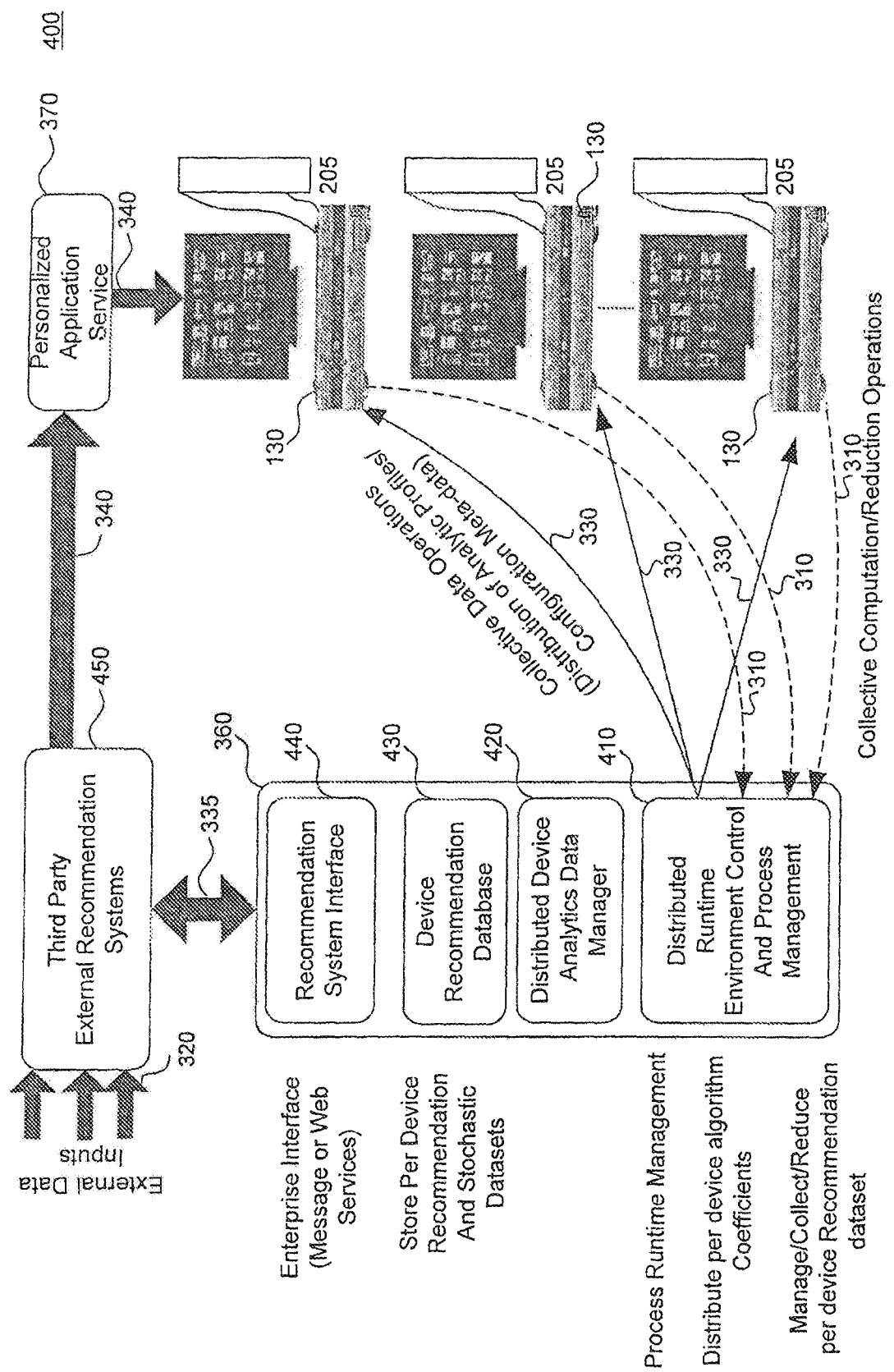
FIG. 4 is a block diagram of an architecture of a predictive content placement system according to an embodiment.

FIG. 4 is a block diagram of an architecture of a predictive content placement system 400 according to an embodiment. The system 400 can compute distributed stochastic user behavior signatures for use with data mining applications, recommendation systems, and personalized services. An embodiment of viewing data analyzer 360 is shown in detail, interacting with viewing devices 130, client agents 205, third party external recommendation systems 450 and personalized services server 370.

Viewing data analyzer 360 may include a distributed runtime environment control and process management module 410, distributed device analytics data manager 420, device recommendation database 430, and recommendation system interface 440.

Distributed runtime environment control and process management module 410 may be configured to receive user data 310 from viewing devices 130/150, e.g., receive the results of collective computation/reduction operations. Distributed runtime environment control and process management module 410 can perform collective data operations, e.g., distribution of analytic profiles and/or configuration meta data. Such collective data operations can provide operating parameters 330 to the viewing devices 130/150. For example, the distributed runtime environment control and process management module 410 may perform process runtime management, and scatter/distribute per device algorithms/coefficients to the viewing devices 130/150 to be used in distributed processing at the viewing devices 130/150. Scattering may include sending initialization values to the viewing devices 130/150 during an initialization phase or whenever appropriate to update the devices/client agents 205. Distributed runtime environment control and process management module 410 may also provide operating parameters 330 as feedback, including algorithms, transition coefficients, and other parameters used for distributed processing at the viewing devices 130/150. The distributed runtime environment control and process management module 410 may also manage/collect/reduce per device recommendation datasets, and/or gather per device results, including user data 310 that may be associated with raw data and/or processing of raw data including user inputs.

The distributed device analytics data manager 420 of viewing data analyzer 360 may perform analysis, including management of distributed device analytics data. Device recommendation database 430 may store per device recommendation and stochastic datasets. The recommendation system interface 440 may provide an enterprise interface, including message or web services. The results 335 obtained by viewing data analyzer 360 are passed to third party external recommendation systems 450.

Third party external recommendation systems 450 may receive external data inputs (e.g., ad meta-data 320) and provide results 340. The results 340 obtained by third party external recommendation systems 450 are passed to personalized services server 370. Personalized services server 370 may provide personalized application service (e.g., services 340) to viewing devices 130/150.

User data 310 gathered by distributed runtime environment control and process management module 410 may be produced, e.g., by the client agents 205 of viewing devices 130/150, based on various algorithms including HMM, Bayesian, cluster analysis, and other machine inference and learning algorithms. Particular algorithms used may depend on the application. A Hidden Markov Model (HMM) may predict a next state based on a previous state, using a matrix of probabilities. For example, a channel behavior transition matrix may be used, populated with operating parameters 330 scattered per device by the distributed embedded analytics manager 310. A Bayesian statistics model also may be used. The models may operate on transitional values weighted by coefficient values, which may be updated real-time based on feedback.

Figure 5:
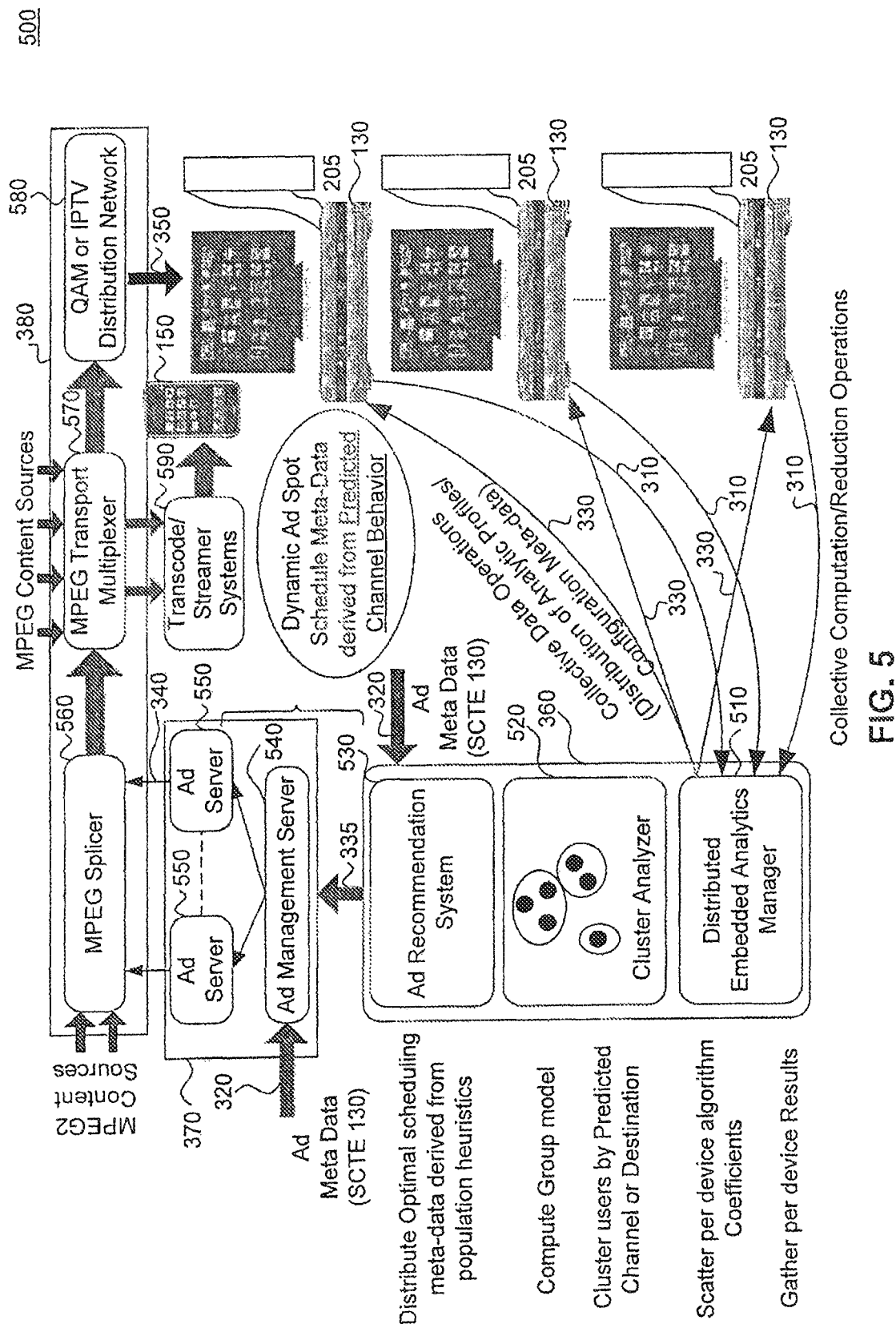
FIG. 5 is a block diagram of an architecture of a predictive content placement system according to an embodiment.

FIG. 5 is a block diagram of an architecture of a predictive content placement system 500 according to an embodiment. Embodiments of viewing data analyzer 360, personalized services server 370, and content server 380 are shown in detail in the context of advertisement recommendation, prediction and serving.

Viewing data analyzer 360 of FIG. 5 may include a distributed embedded analytics manager 510, cluster analyzer 520, and ad recommendation system 530. Distributed embedded analytics manager 510 may be configured to receive user data 310 from the viewing devices 130/150 and client agents 205. Distributed embedded analytics manager 510 can provide operating parameters 330 to the viewing devices 130/150 and client agents 205. Accordingly, the distributed embedded analytics manager 510 provides collective data operations (distribution of analytic profiles/configuration meta-data) and collective computation/reduction operations.

The cluster analyzer 520 of viewing data analyzer 360 may cluster users by predicted channel and/or destination, and may compute a group model. Performing cluster analysis at the head-end 110 (e.g., at the viewing data analyzer 360) may generate a list of predicted channel/services organized by groups. The cluster analyzer 520 may cluster all users into groups that are predicted to, e.g., view or tune to a destination X at some specified time T. Thus, cluster analysis is applicable to the task of advertisement recommendation because advertisements can be targeted at groups of users that the cluster analyzer 520 has determined are appropriate for receiving an advertisement. The results of cluster analysis may be passed to the ad recommendation system 530.

The ad recommendation system 530 may use the cluster analysis results, along with ad meta data 320, for optimal ad placement and maximizing customer impression yields. For example, the ad recommendation system 530 may determine and/or distribute optimal scheduling meta-data derived from population heuristics as identified by cluster analyzer 520. The resulting output 335 obtained by viewing data analyzer 360 is passed to personalized services server 370.

Personalized services server 370 may include an ad management server 540 and a plurality of sub ad servers 550. The personalized services server 370 receives ad meta data 320, and input 335 from viewing data analyzer 360. Accordingly, personalized services server 370 may provide dynamic ad spot schedule meta data derived from predicted channel behavior. Personalized services server 370 may provide services 340 (via a plurality of sub ad servers 550) to content server 380.

Content server 380 may include MPEG splicer 560, MPEG transport multiplexer 570, and distribution network 580. Although the embodiment of FIG. 5 is illustrated in the context of MPEG2 content, alternative forms of content may be used. Content server 380 provides viewing content 350, which may be distributed to the viewing devices 130/150. MPEG transport multiplexer 570 can send output to transcode/streamer systems 590, which can format content for use on portable viewing device 150.

Figure 6:
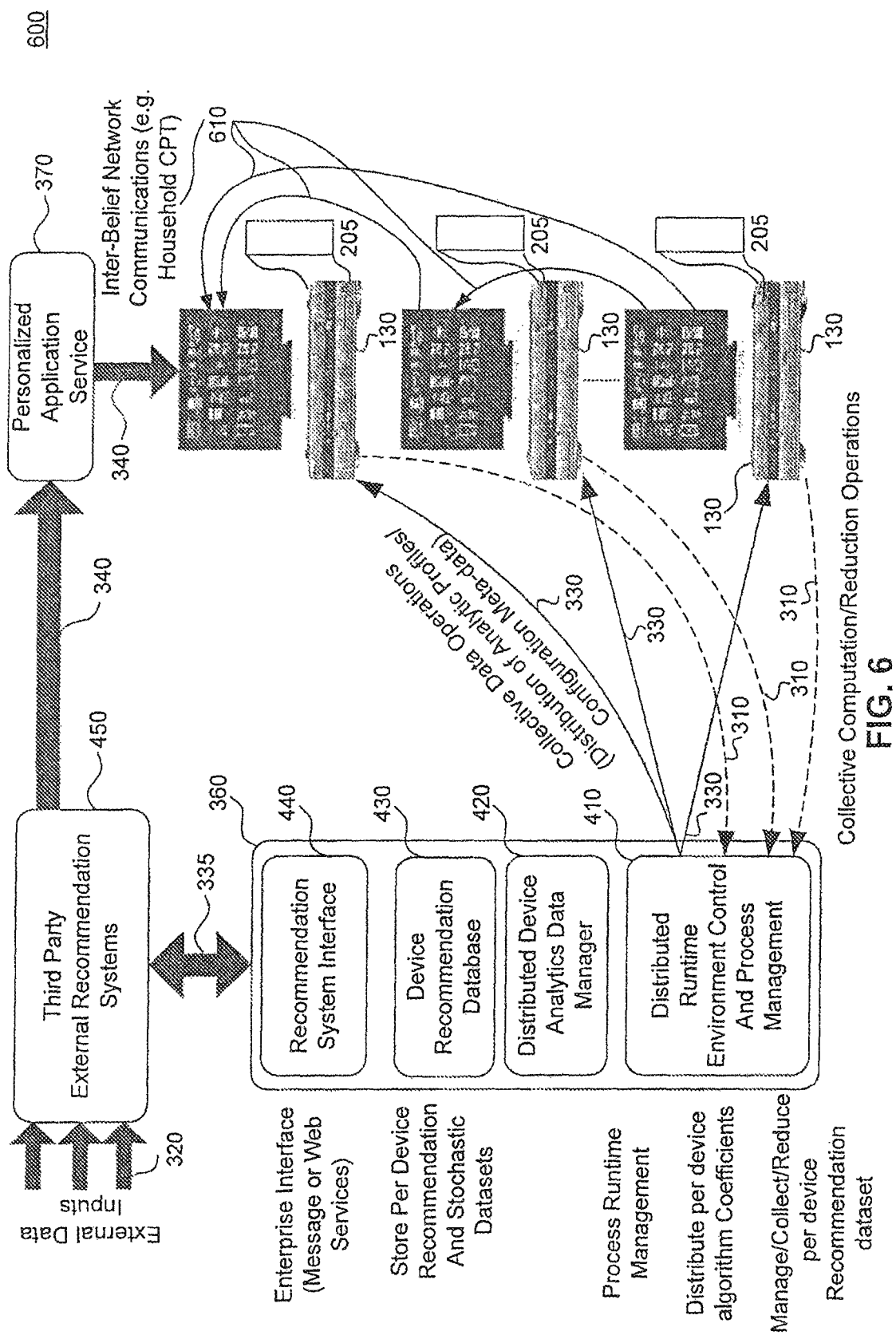
FIG. 6 is a block diagram of an architecture of a predictive content placement system including inter-agent communication according to an embodiment.

FIG. 6 is a block diagram of an architecture of a predictive content placement system 600 including inter-agent communications according to an embodiment. The system 600 can compute distributed stochastic user behavior signatures for use with data mining applications, recommendation systems, and personalized services. As in FIG. 4, an embodiment of viewing data analyzer 360 is shown in detail, interacting with viewing devices 130, client agents 205, third party external recommendation systems 450 and personalized services server 370.

System 600 can include inter-belief (inter-agent) network communications 610, enabling multiple agents 205 (on respective viewing devices 130/150) to communicate with each other. For example, multiple viewing devices 130 in a household can exchange information with each other to provide improved analysis associated with a household or other grouping of viewing devices 130. Predictive content placement can be applied to the entire household, by identifying characteristics among multiple viewing devices 130/150. Additional elements and features of FIG. 6 are similar to those set forth above regarding FIG. 4.

Figure 7:
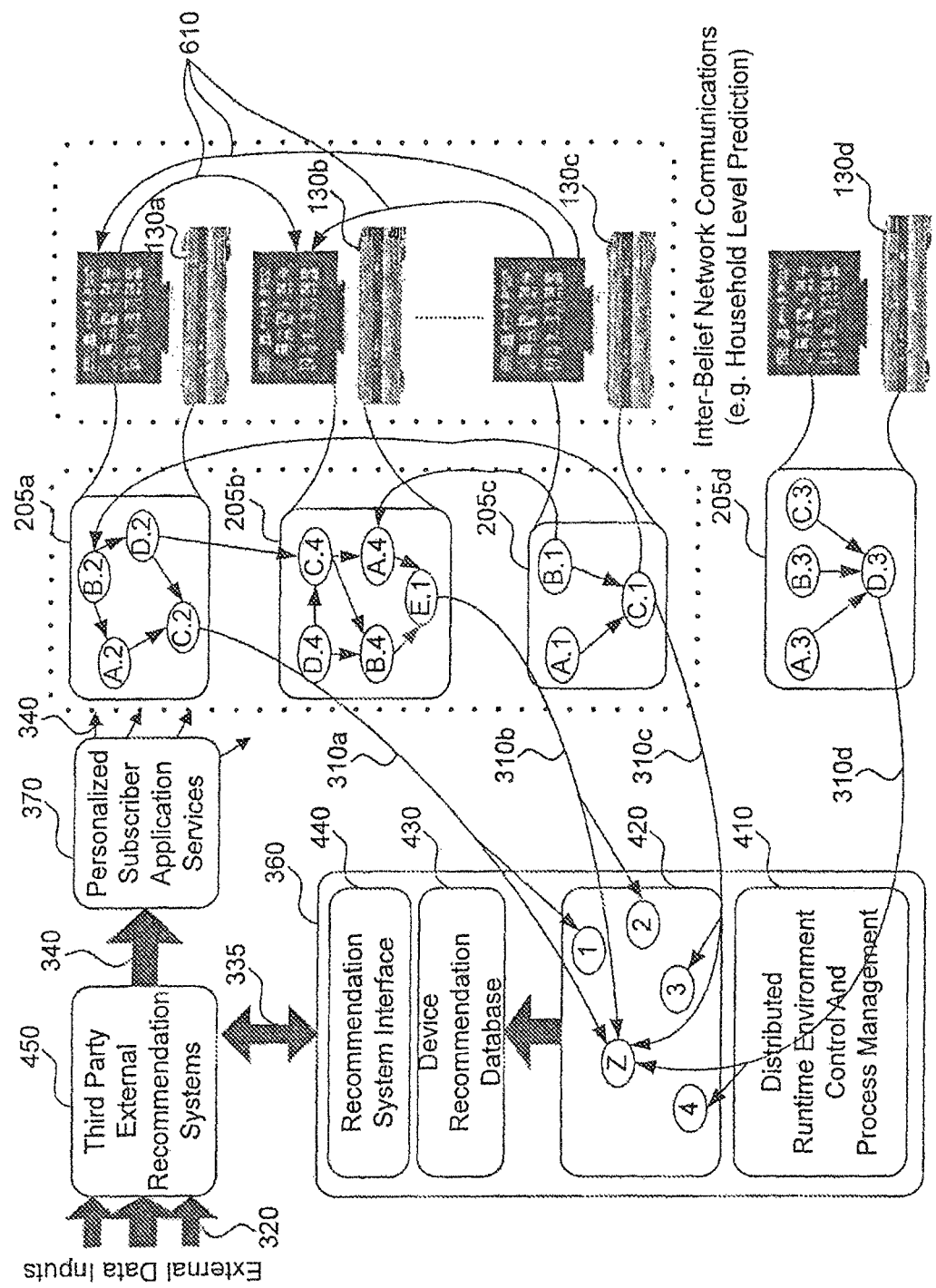
FIG. 7 is a block diagram of an architecture of a predictive content placement system including belief networks according to an embodiment.

FIG. 7 is a block diagram of an architecture of a predictive content placement system 700 including belief networks according to an embodiment. Viewing devices 130a-130d are associated with client agents 205a-205d, respectively. Client agents 205a-205d are represented in FIG. 7 as belief networks, although other embodiments of client agents 205a-205d are contemplated and described throughout the present application.

Belief networks can operate in situations involving uncertainty, e.g., belief networks can be used to represent a probability table and show causal relationships between particular variables. Variables associated with the belief network are represented in FIG. 7 as nodes (ovals). Nodes are connected by causal links, represented in FIG. 7 by arrows, pointing from parent nodes (causes) to child nodes (effects). A parent node, such as B.4, can influence a child node, such as E.1. A parent node (C.4) also can be a child of another node (D.2). FIG. 7 further illustrates five subnetworks of associated nodes, 205a, 205b, 205c, 205d, and 420. The subnetworks in FIG. 7 form a distributed belief network.

The distributed belief network can include causal relationships between subnetworks to model the inter-belief (inter-agent) network communications 610. As illustrated, distributed subnetworks 205a-205d can influence centralized subnetwork 420. Subnetwork 205a can influence subnetwork 420 via causal link 310a from node C.2. Subnetwork 205b can influence subnetwork 420 via causal link 310b from node E.1. Subnetwork 205c can influence subnetwork 420 via causal link 310c from node C.1. Subnetwork 205d can influence subnetwork 420 via causal link 310d from node D.3.

The subnetworks 205a, 205b, and 205c can influence each other, representing causal interactions 610 that may occur in addition to and/or separate from a centralized head-end. Subnetworks 205a and 205c include causal links to subnetwork 205b, and subnetwork 205c includes a causal link to subnetwork 205a. Accordingly, processing inputs and/or results may be passed between subnetworks, such as subnetworks in a household to provide household-level prediction. Furthermore, additional information 340 may be passed globally to subnetworks 205a-205d, e.g., initialization values, algorithms, feedback, and other information sent from the head-end to the distributed agents.

Subnetwork 420 includes nodes 1, 2, 3, and 4 causally linked to subnetworks 205a, 205b, 205c, and 205d, respectively. Thus, each of nodes 1-4 can be influenced by, and provide results for, the specific corresponding subnetwork 205a-205d. The system (e.g., viewing data analyzer 360), therefore, can provide a local recommendation for each of the viewing devices 130a-130d based on the associated nodes 1-4, respectively. Node Z of subnetwork 420 is causally linked to all of the subnetworks 205a-205d. Thus, node Z can provide inferences/results corresponding to the entire system of all subnetworks/client agents. Additional nodes are contemplated, e.g., a node at subnetwork 420 causally linked to less than all of the subnetworks 205a-205d that are associated with viewing devices 130a-130d. For example, a node at subnetwork 420 can be causally linked to subnetworks 205a, 205b, and 205c, corresponding to a household-level prediction for the viewing devices 130a, 130b, and 130c enclosed in dotted lines in FIG. 7.

Figure 8:
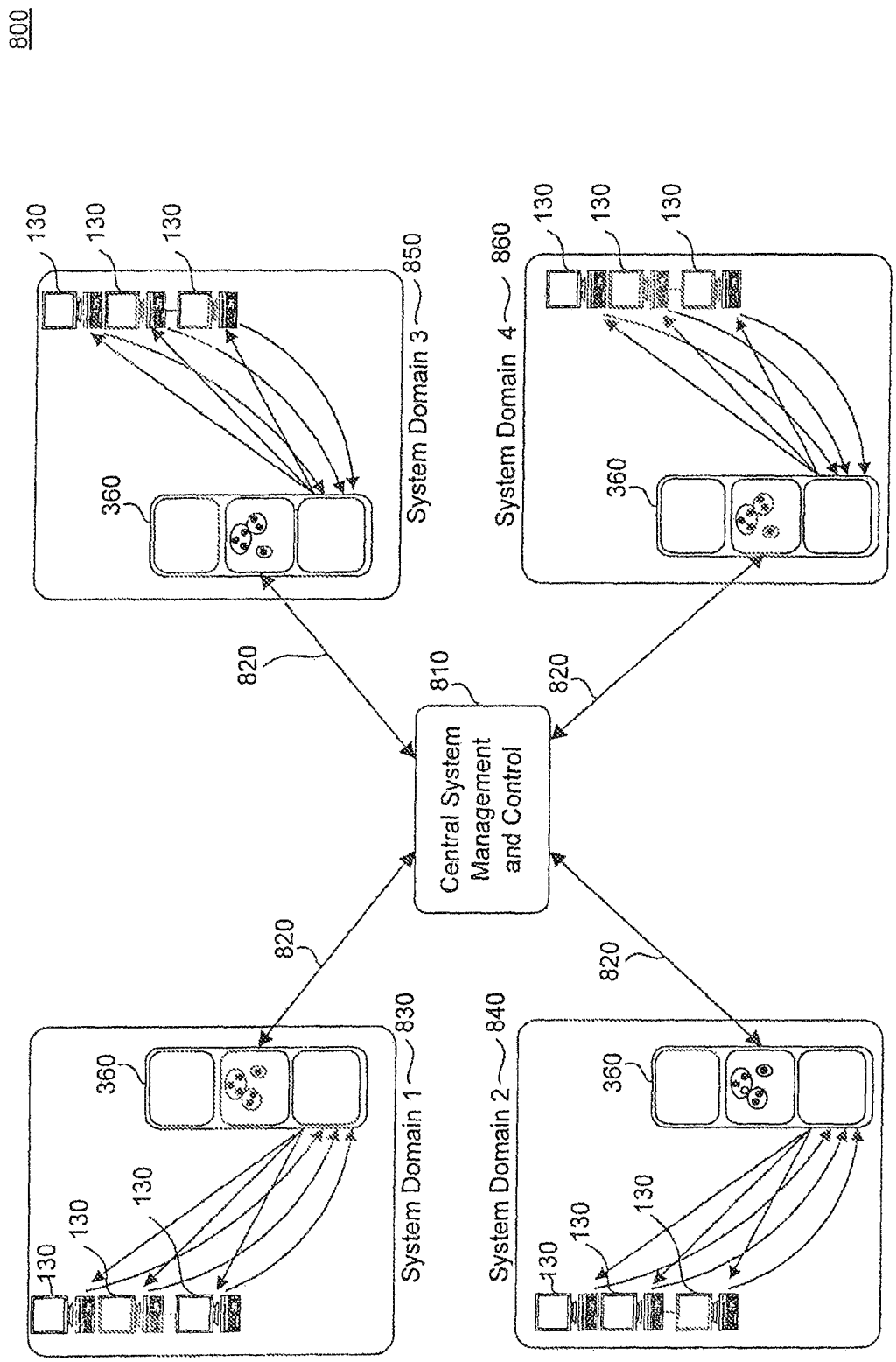
FIG. 8 is a block diagram of an architecture of a predictive content placement system including multiple system domains according to an embodiment.

FIG. 8 is a block diagram of an architecture of a predictive content placement system 800 including multiple system domains 830, 840, 850, and 860 according to an embodiment. Each system domain 830, 840, 850, and 860 includes a viewing data analyzer 360, in communication with associated viewing devices 130/150 and a central system management and control module 810. The viewing data analyzers 360 communicate with the central system management and control module 810 using paths 820. Communication may be facilitated using Messaging Processing Interface (MPI) language, Hypertext Transfer Protocol (HTTP), or the like for purposes of distributed computing.

The recommendation framework, and the distributed processing technology where multiple head-end systems (system domains 830, 840, 850, and 860) are tied together, enables the formation of a larger distributed processing system. In the embodiment illustrated in FIG. 8, distributed messaging passing technology is used to exchange predictors and/or viewing parameters. Passing information among the system domains 830, 840, 850, and 860, and associated viewing devices 130/150, enhances system scalability and coordination among cooperating systems. Scalability enables support for a full-scale embedded device population. Recommendation values may be shared across a wide population of system domains and applications, enabling complex recommendations and/or business rules to be addressed.

Figure 9:
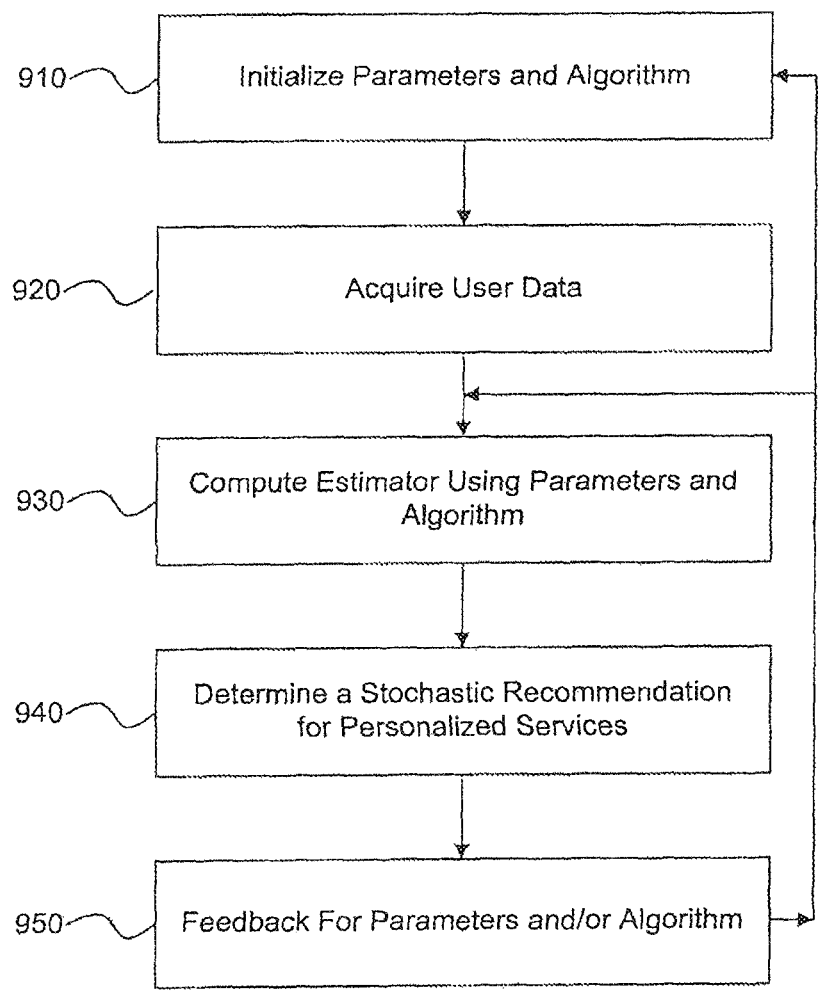
FIG. 9 is an example flow chart based on predictive content placement according to an embodiment.

FIG. 9 is an example flow chart 900 based on predictive content placement according to an embodiment. In step 910, parameters and algorithms are initialized. For example, a HMM algorithm and transition matrix values may be provided to each viewing device during an initialization phase as illustrated in FIG. 2. In step 920, user data is acquired. Acquisition of user data may be performed directly at the viewing device 130/150. Alternatively, user data may be queued-up remotely, e.g., on portable viewing device 150, and periodically uploaded to viewing device 130 for bulk processing. In step 930, estimators are computed using the parameters and algorithm. An estimator may be a summary state vector representing a maximum likelihood estimation of predicted future behavior in a probabilistic sense, based on present and/or past user data. In step 940, a stochastic recommendation for personalized services is determined. The stochastic recommendation can include maximizing user impression yield by identifying which content (e.g., advertisements) and what placement (e.g., time/channel/cluster of users) will coincide with predicted user behavior to generate maximum user yield. Maximizing user impression yield may include predicting which users are likely to watch the identified content, without tuning away. In step 950, feedback is used to update parameters and/or algorithms, if applicable. For example, tune-aways by users may be detected and used as negative feedback in real-time to adjust the parameters and serve different content to maximize yield. Feedback may be provided for initialization at step 910, and also may be provided to compute estimators at step 930 (without requiring an initialization phase).

Figure 10:
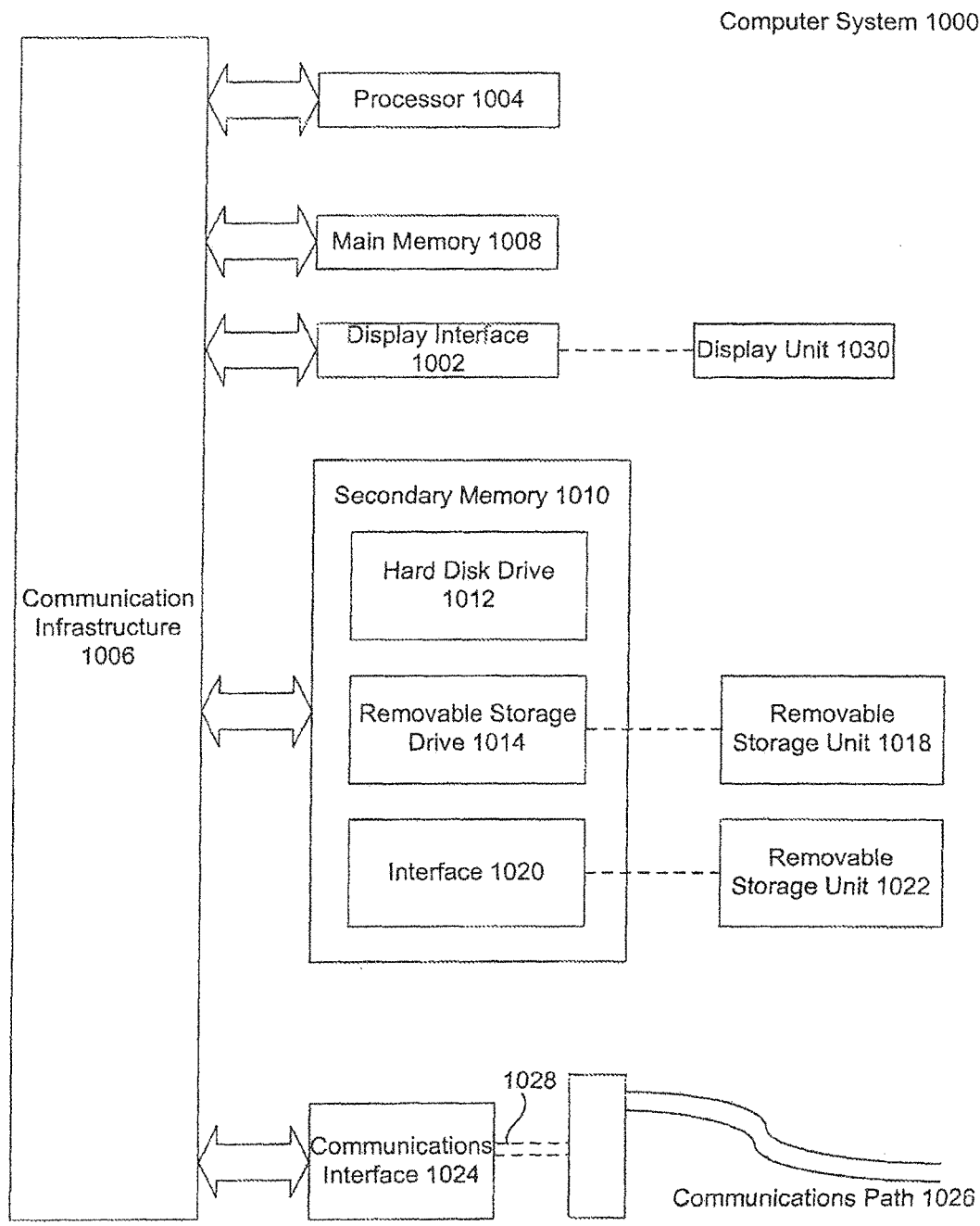
FIG. 10 is a block diagram of an exemplary computer system on which embodiments may be implemented.

FIG. 10 is a schematic block diagram of an example computer system 1000 used to implement embodiments of an advertisement placement system, and/or other systems. Various aspects of the various embodiments may be implemented by software, firmware, hardware, or a combination thereof. FIG. 10 illustrates an example computer system 1000 in which an embodiment, or portions thereof, may be implemented as computer-readable code. Various embodiments are described in terms of this example computer system 1000. After reading this description, it will become apparent to a person skilled in the relevant art how to implement embodiments using other computer systems and/or computer architectures.

Computer system 1000 includes one or more processors, such as processor 1004. Processor 1004 may be a special purpose or a general purpose processor. Processor 1004 is connected to a communication infrastructure 1006 (for example, a bus or network). Computer system 1000 also includes a display interface 1002 and display unit 1030.

Computer system 1000 also includes a main memory 1008, preferably random access memory (RAM), and may also include a secondary memory 1010. Secondary memory 1010 may include, for example, a hard disk drive 1012 and/or a removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a tangible computer readable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (e.g., an Ethernet card), a communications port, a PCMCIA slot and card, or the like. Software and data transferred via communications interface 1024 are provided to communications interface 1024 via a communications path 1026. Communications path 1026 may be implemented using wire or cable, fiber optics, a phone line, a cellular phone link, an RF link or other communications channels including channel 1028.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement embodiments as discussed herein, such as the system described above. In particular, the computer programs, when executed, enable processor 1004 to implement the processes of embodiments. Accordingly, such computer programs represent controllers of the computer system 1000. Where embodiments are implemented using software, the software may be stored in a computer program product and loaded into computer system 1000 using removable storage drive 1014, interface 1020, hard drive 1012 or communications interface 1024.

Described above are systems, apparatuses, and methods for advertisement placement, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for providing advertisements to a group of media devices from among a plurality of media devices, the system comprising:
    a memory configured to store a plurality of instructions; and
    a processor configured to execute the plurality of instructions, the plurality of instructions, when executed by the processor, configuring the processor to:
        predict a plurality of user behaviors of a plurality of users of the plurality of media devices based upon data relating to viewing of a first advertisement from among a plurality of advertisements by the plurality of users,
        select a second advertisement from among the plurality of advertisements whose content and placement coincide with user behavior for a group of users having similar user behaviors from among a plurality of user behaviors, and
        provide the second advertisement to the group of media devices from among the plurality of media devices that is associated with the group of users.

2. The system of claim 1, wherein the plurality of instructions, when executed by the processor, further configure the processor to receive a plurality of state vector summaries of the data.

3. The system of claim 1, wherein the data comprises:
a plurality of user control inputs at the plurality of media devices in response to viewing the first advertisement.

4. The system of claim 3, wherein the plurality of user control inputs comprises:
channel tuning of the plurality of users; or
commands entered by the plurality of users.

5. The system of claim 1, wherein the plurality of instructions, when executed by the processor, further configure the processor to cluster users from among the plurality of users having the similar user behaviors into the group of users.

6. The system of claim 5, wherein the plurality of instructions, when executed by the processor, configure the processor to:
cluster the users predicted to tune to a specified destination at a specified time into the group of users, and
select the second advertisement whose content and placement coincide with the specified destination at the specified time.

7. The system of claim 1, wherein the plurality of instructions, when executed by the processor, further configure the processor to select the second advertisement whose content and placement coincide with meta data from among a plurality of advertisement meta data associated with the plurality of advertisements.

8. The system of claim 7, wherein the plurality of advertisement meta data comprises:
scheduling data corresponding to the plurality of advertisements.

9. The system of claim 1, wherein the plurality of instructions, when executed by the processor, configure the processor to predict the plurality of user behaviors from the data in accordance with an algorithm.

10. The system of claim 9, wherein the algorithm comprises:
Hidden Markov Model (HMM).

11. A system for providing content to a group of media devices from among a plurality of media devices, the system comprising:
a memory configured to store a plurality of instructions; and
a processor configured to execute the plurality of instructions, the plurality of instructions, when executed by the processor, configuring the processor to:
cluster users from among a plurality of users predicted to tune to a specified destination at a specified time into a group of users from among the plurality of users in response to data relating to viewing of a first advertisement from among a plurality of advertisements by the plurality of users,
select a second advertisement from among the plurality of advertisements whose content and placement coincide with the specified destination at the specified time, and
provide the second advertisement to the group of media devices from among the plurality of media devices that is associated with the group of users.

12. The system of claim 11, wherein the plurality of instructions, when executed by the processor, further configure the processor to predict a plurality of destinations of the plurality of users and a plurality of times of the plurality of users based upon the data relating to the viewing of the first advertisement by the plurality of users.

13. The system of claim 12, wherein the data comprises:
a plurality of user control inputs at the plurality of media devices in response to viewing the first advertisement.

14. The system of claim 13, wherein the plurality of user control inputs comprises:
channel tuning of the plurality of users; or
commands entered by the plurality of users.

15. The system of claim 11, wherein the plurality of instructions, when executed by the processor, further configure the processor to select the second advertisement whose content and placement coincide with meta data from among a plurality of meta data associated with the plurality of advertisements.

16. The system of claim 15, wherein the plurality of meta data comprises:
scheduling data corresponding to the plurality of advertisements.

17. A computer-implemented method for providing content to a group of media devices from among a plurality of media devices, the method comprising:
predicting a plurality of user behaviors of a plurality of users of the plurality of media devices based upon data relating to viewing of a first advertisement from among a plurality of advertisements by the plurality of users;
clustering users from among the plurality of users having similar user behaviors from among the plurality of user behaviors into a group of users from among the plurality of users;
selecting a second advertisement from among the plurality of advertisements whose content and placement coincide with user behavior for the group of users from among a plurality of user behaviors, and
providing the second advertisement to the group of media devices from among the plurality of media devices that is associated with the group of users.

18. The method of claim 17, further comprising:
receiving a plurality of state vector summaries of the data.

19. The method of claim 17, wherein the selecting comprises:
selecting the second advertisement whose content and placement coincide with meta data from among a plurality of meta data associated with the plurality of advertisements.

20. The method of claim 19, wherein the plurality of meta data comprises:
scheduling data corresponding to the plurality of advertisements.

* * * * *